United States Patent
Zhang et al.

(10) Patent No.: US 11,939,921 B2
(45) Date of Patent: Mar. 26, 2024

(54) COMBUSTION-GAS SUPPLY SYSTEM AND METHOD THEREOF, DEVICE EQUIPPED WITH TURBINE ENGINE, AND FRACTURING SYSTEM

(71) Applicant: YANTAI JEREH PETROLEUM EQUIPMENT & TECHNOLOGIES CO., LTD., Shandong (CN)

(72) Inventors: Peng Zhang, Shandong (CN); Rikui Zhang, Shandong (CN); Jianwei Wang, Shandong (CN); Xiaolei Ji, Shandong (CN); Zhuqing Mao, Shandong (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

(21) Appl. No.: 17/715,562

(22) Filed: Apr. 7, 2022

(65) Prior Publication Data
US 2023/0145963 A1    May 11, 2023

(30) Foreign Application Priority Data

Nov. 9, 2021  (CN) .......................... 202111317278.8
Nov. 9, 2021  (CN) .......................... 202122726296.3

(51) Int. Cl.
*F02C 7/22*      (2006.01)
*E21B 43/26*    (2006.01)
(Continued)

(52) U.S. Cl.
CPC .............. *F02C 7/222* (2013.01); *E21B 43/26* (2013.01); *E21B 43/2607* (2020.05); *F17D 1/04* (2013.01);
(Continued)

(58) Field of Classification Search
CPC .... F02C 7/222; F02C 6/00; F02C 9/26; F02C 9/263; E21B 43/26; E21B 43/2607; F17D 1/04
See application file for complete search history.

(56) References Cited

U.S. PATENT DOCUMENTS 4,280,323 A * 7/1981 Jersey ...................... F02C 9/40
                                                                    60/790
6,079,198 A   6/2000 Prowse et al.
(Continued)

FOREIGN PATENT DOCUMENTS

CN       1310292 A    8/2001
CN    203626662 U    6/2014
(Continued)

OTHER PUBLICATIONS

International Search Report and Written Opinion dated Aug. 15, 2022 for International Application No. PCT/CN2022/076182.
(Continued)

*Primary Examiner* — Gerald L Sung
*Assistant Examiner* — Rene D Ford
(74) *Attorney, Agent, or Firm* — Crowell & Moring LLP

(57) ABSTRACT

A combustion-gas supply system and a combustion-gas supply method thereof, a device equipped with a turbine engine, and a fracturing system are provided. The combustion-gas supply system includes a main pipeline and a multi-functional pipeline; the main pipeline includes a first sub-pipeline and a second sub-pipeline; the first sub-pipeline includes a first gas intake pipe, a first gas supply valve and a first gas outlet pipe arranged in sequence; the second sub-pipeline includes a combustion-gas supply valve and a gas supply pipe, the first gas outlet pipe is connected with the combustion-gas supply valve, the gas supply pipe is configured to be connected with a turbine engine, the multi-functional pipeline includes a second gas intake pipe, a
(Continued)

second gas supply valve and a second gas outlet pipe arranged in sequence, and the second gas outlet pipe is communicated with the first gas outlet pipe.

16 Claims, 6 Drawing Sheets

(51) Int. Cl.
  *F17D 1/04* (2006.01)
  *F02C 6/00* (2006.01)
  *F02C 9/26* (2006.01)
(52) U.S. Cl.
  CPC .................. *F02C 6/00* (2013.01); *F02C 9/26* (2013.01); *F02C 9/263* (2013.01)

(56) References Cited

U.S. PATENT DOCUMENTS

| | | | |
|---|---|---|---|
| 10,020,711 B2* | 7/2018 | Oehring | ............... F04B 17/03 |
| 10,830,032 B1 | 11/2020 | Zhang | |
| 10,961,908 B1 | 3/2021 | Yeung | |
| 2011/0118967 A1 | 5/2011 | Tsuda | |
| 2011/0290483 A1 | 12/2011 | Zornes | |
| 2012/0085079 A1 | 4/2012 | Kaminsky | |
| 2014/0042199 A1 | 2/2014 | Gregory, Jr. | |
| 2015/0204239 A1 | 7/2015 | Minto | |
| 2015/0205006 A1 | 7/2015 | Maerten | |
| 2016/0032702 A1 | 2/2016 | Gay | |
| 2017/0009666 A1 | 1/2017 | Cano Wolff et al. | |
| 2017/0052070 A1 | 2/2017 | Marsh | |
| 2017/0074074 A1 | 3/2017 | Joseph et al. | |
| 2017/0145918 A1 | 5/2017 | Oehring | |
| 2017/0203241 A1 | 7/2017 | Subedi | |
| 2017/0321608 A1* | 11/2017 | Crowley | ............... F02C 7/222 |
| 2019/0211661 A1 | 7/2019 | Reckels et al. | |
| 2019/0211814 A1 | 7/2019 | Weightman et al. | |
| 2019/0323428 A1 | 10/2019 | Oehring et al. | |
| 2021/0079758 A1* | 3/2021 | Yeung | ............... E21B 43/267 |
| 2021/0198993 A1 | 7/2021 | Christinzio | |
| 2021/0223801 A1 | 7/2021 | Lawson | |
| 2021/0372256 A1* | 12/2021 | Yeung | ............... F02M 21/023 |

FOREIGN PATENT DOCUMENTS

| | | |
|---|---|---|
| CN | 105334061 A | 2/2016 |
| CN | 106285603 A | 1/2017 |
| CN | 206205996 U | 5/2017 |
| CN | 207111064 U | 3/2018 |
| CN | 207503423 U | 6/2018 |
| CN | 109906305 A | 6/2019 |
| CN | 110469314 A | 11/2019 |
| CN | 210422814 U | 4/2020 |
| CN | 111089003 A | 5/2020 |
| CN | 112664356 A | 4/2021 |
| CN | 112879160 A | 6/2021 |
| CN | 113982758 A | 1/2022 |

OTHER PUBLICATIONS

International Search Report dated Sep. 30, 2020, corresponding PCT/CN2020/070664.

Written Opinion dated Sep. 30, 2020, corresponding PCT/CN2020/070664.

* cited by examiner

COMBUSTION-GAS SUPPLY SYSTEM AND METHOD THEREOF, DEVICE EQUIPPED WITH TURBINE ENGINE, AND FRACTURING SYSTEM

CROSS REFERENCES TO RELATED APPLICATIONS

The present application is based on and claims priority to Chinese Patent Application No. 202111317278.8 filed with CNIPA on Nov. 9, 2021, and Chinese Patent Application No. 202122726296.3 filed with CNIPA on Nov. 9, 2021, the present disclosures of which are incorporated herein by reference in their entireties as part of the present disclosure.

TECHNICAL FIELD

Embodiments of the present disclosure relate to a combustion-gas supply system, a combustion-gas supply method, a device equipped with a turbine engine, and a fracturing system.

BACKGROUND

In the field of oil and gas extraction, fracturing technology refers to a technology that uses hydraulic action to form fractures in oil and gas layers in a process of oil production or gas production. Fractures are formed in oil and gas layers through the fracturing technology, so that a flow environment of oil or gas under the ground can be improved, and production of oil wells can be increased.

On the other hand, a turbine engine has advantages of small size, light weight, high power and good fuel economy, which is widely used in fracturing devices and power generation devices. The turbine engine has good fuel compatibility, and diesel, liquefied natural gas (LNG), compressed natural gas (CNG), and even biofuels can be used as fuel for turbine engines.

SUMMARY

Embodiments of the present disclosure relate to a combustion-gas supply system, a combustion-gas supply method, a device equipped with a turbine engine, and a fracturing system. The combustion-gas supply system can introduce high-pressure gas (for example, high pressure air) into the first sub-pipeline from the first gas outlet pipe through the multi-functional pipeline, to discharge residual combustion-gas in the first sub-pipeline, so as to improve the safety of the combustion-gas supply system and reduce the on-site operation difficulty and cost; on the other hand, the combustion-gas supply system can also conduct pressure test on the main pipeline before operation through the multi-functional pipeline to eliminate potential safety hazards, such as leakage of the main pipeline, in advance. The combustion-gas supply system can also supply combustion-gas through a multi-functional pipeline in a case that the gas in the main pipeline is insufficient, so as to ensure the stable and continuous operation of the whole combustion-gas supply system.

At least one embodiment of the present disclosure provides a combustion-gas supply system, which includes: a main pipeline, including a first sub-pipeline and a second sub-pipeline connected with the first sub-pipeline; and a multi-functional pipeline, the first sub-pipeline includes a first gas intake pipe, a first gas supply valve and a first gas outlet pipe arranged in sequence, the first gas intake pipe is configured to input combustion-gas; the second sub-pipeline includes a combustion-gas supply valve and a gas supply pipe, the first gas outlet pipe is connected with the combustion-gas supply valve, the gas supply pipe is configured to be connected with a turbine engine, the multi-functional pipeline includes a second gas intake pipe, a second gas supply valve and a second gas outlet pipe arranged in sequence, and the second gas outlet pipe is communicated with the first gas outlet pipe.

For example, in the combustion-gas supply system provided by an embodiment of the present disclosure, the first sub-pipeline further includes: a combustion-gas pressure regulating valve, located between the first gas supply valve and the first gas outlet pipe; and a bypass one-way valve, an input end of the bypass one-way valve is communicated with the first gas outlet pipe, an output end of the bypass one-way valve is located between the combustion-gas pressure regulating valve and the first gas supply valve, the bypass one-way valve is able to be flowed through in a direction from the input end to the output end, and is not able to be flowed through in a direction from the output end to the input end.

For example, in the combustion-gas supply system provided by an embodiment of the present disclosure, the first sub-pipeline further includes: at least one gas filter, located between the first gas supply valve and the combustion-gas pressure regulating valve; and a gas source pressure gauge, located between the first gas supply valve and the gas filter, or located between the first gas intake pipe and the first gas supply valve, the output end of the bypass one-way valve is located between the gas filter and the combustion-gas pressure regulating valve.

For example, in the combustion-gas supply system provided by an embodiment of the present disclosure, the first sub-pipeline further includes a first pressure sensor, the first pressure sensor is located between the first gas supply valve and the gas filter, and the first pressure sensor is configured to monitor gas supply pressure in real time.

For example, the combustion-gas supply system provided by an embodiment of the present disclosure further includes: a blowdown valve, located between the first gas supply valve and the combustion-gas pressure regulating valve, a height of the blowdown valve is less than a height of the main pipeline.

For example, in the combustion-gas supply system provided by an embodiment of the present disclosure, the first sub-pipeline further includes: a gas temperature sensor, located on the first gas outlet pipe and configured to detect temperature of combustion-gas in the first gas outlet pipe; and a second pressure sensor, located on the first gas outlet pipe and configured to detect pressure of the combustion-gas in the first gas outlet pipe.

For example, the combustion-gas supply system provided by an embodiment of the present disclosure further includes: a first gas supply interface, including a first gas delivery pipe, the first gas delivery pipe is communicated with the first gas intake pipe; a second gas supply interface, including a second gas delivery pipe, the second gas delivery pipe is communicated with the first gas intake pipe; and a third gas supply interface, including a third gas delivery pipe, the third gas delivery pipe is communicated with the first gas intake pipe, both a pipe diameter of the second gas delivery pipe and a pipe diameter of the third gas delivery pipe are larger than a pipe diameter of the first gas delivery pipe, and both the pipe diameter of the second gas delivery pipe and the pipe diameter of the third gas delivery pipe are larger than a pipe diameter of the first gas intake pipe.

For example, in the combustion-gas supply system provided by an embodiment of the present disclosure, both the pipe diameter of the second gas delivery pipe and the pipe diameter of the third gas delivery pipe are greater than or equal to two times of the pipe diameter of the first gas delivery pipe.

For example, in the combustion-gas supply system provided by an embodiment of the present disclosure, the second sub-pipeline further includes: a flow control valve, located between the combustion-gas supply valve and the gas supply pipe; and a gas one-way valve, an input end of the gas one-way valve is connected with the flow control valve, and an output end of the gas one-way valve is communicated with the gas supply pipe.

For example, in the combustion-gas supply system provided by an embodiment of the present disclosure, the second sub-pipeline further includes: a gas exhaust valve, located between the combustion-gas supply valve and the gas one-way valve.

At least one embodiment of the present disclosure further provides a device equipped with a turbine engine, which includes: a turbine engine; and the abovementioned combustion-gas supply system, the turbine engine includes a fuel nozzle, and the gas supply pipe is configured to provide combustion-gas to the fuel nozzle.

At least one embodiment of the present disclosure further provides a combustion-gas supply method of the combustion-gas supply system, which includes: before supplying combustion-gas, turning on the second gas supply valve, and introducing first high-pressure gas into the first sub-pipeline through the multi-functional pipeline, to test pressure of the first sub-pipeline; and after operation is completed, turning on the second gas supply valve, and introducing second high-pressure gas into the first sub-pipeline through the multi-functional pipeline, to discharge residual combustion-gas in the first sub-pipeline from the first gas intake pipe.

For example, the combustion-gas supply method of the combustion-gas supply system provided by an embodiment of the present disclosure further including: during operation, in a case where pressure of combustion-gas in the first gas outlet pipe is less than a preset value, turning on the second gas supply valve, and introducing combustion-gas into the first gas outlet pipe through the multi-functional pipeline.

For example, in the combustion-gas supply method of the combustion-gas supply system provided by an embodiment of the present disclosure, a plurality of the combustion-gas supply systems are arranged, each of the combustion-gas supply systems further includes: a first gas supply interface including a first gas delivery pipe, and the first gas delivery pipe is communicated with the first gas intake pipe; a second gas supply interface including a second gas delivery pipe, and the second gas delivery pipe is communicated with the first gas intake pipe; and a third gas supply interface including a third gas delivery pipe, and the third gas delivery pipe is communicated with the first gas intake pipe, both a pipe diameter of the second gas delivery pipe and a pipe diameter of the third gas delivery pipe are larger than a pipe diameter of the first gas delivery pipe, and both a pipe diameter of the second gas delivery pipe and a pipe diameter of the third gas delivery pipe are larger than a pipe diameter of the first gas intake pipe, and the combustion-gas supply method further includes: connecting the third gas supply interface in one of two adjacent ones of the combustion-gas supply systems with the second gas supply interface in the other one of the two adjacent ones of the combustion-gas supply systems, to connect the plurality of the combustion-gas supply systems in series.

At least one embodiment of the present disclosure further provides a fracturing system, which includes: a first fracturing device group, including N turbine fracturing devices; a second fracturing device group, including M turbine fracturing devices; a combustion-gas pipeline, the combustion-gas pipeline is respectively connected with the first fracturing device group and the second fracturing device group, and is configured to provide combustion-gas to N+M turbine fracturing devices; a compressed air pipeline, the compressed air pipeline is respectively connected with the first fracturing device group and the second fracturing device group, and is configured to provide compressed air to the N+M turbine fracturing devices; and an auxiliary-energy pipeline, each of the turbine fracturing devices includes a turbine engine and an auxiliary device, and the auxiliary-energy pipeline is respectively connected with the first fracturing device group and the second fracturing device group, and is configured to provide auxiliary-energy to auxiliary devices of the N+M turbine fracturing devices, N and M are positive integers greater than or equal to 2, respectively, each of the turbine fracturing devices includes a turbine engine and the combustion-gas supply system, the combustion-gas supply system is connected with the combustion-gas pipeline, and is configured to provide combustion-gas to the turbine engine.

For example, in the fracturing system provided by an embodiment of the present disclosure, the auxiliary device includes a diesel engine, the auxiliary-energy pipeline is configured to deliver diesel fuel; or, the auxiliary device includes an electric motor, and the auxiliary-energy pipeline is configured to deliver electrical power.

For example, in the fracturing system provided by an embodiment of the present disclosure, the combustion-gas pipeline includes a main combustion-gas pipeline and a plurality of combustion-gas branch pipelines connected with the main combustion-gas pipeline, the auxiliary-energy pipeline includes an auxiliary-energy main pipeline and a plurality of auxiliary-energy branch pipelines connected with the auxiliary-energy main pipeline, the compressed air pipeline includes a compressed air main pipeline and a plurality of compressed air branch pipelines connected with the compressed air main pipeline, the main combustion-gas pipeline, the main auxiliary-energy pipeline and the main compressed air pipeline are arranged between the first fracturing device group and the second fracturing device group.

For example, the fracturing system provided by an embodiment of the present disclosure further includes: a manifold system, located between the first fracturing device group and the second fracturing device group, and configured to transport fracturing fluid, the main combustion-gas pipeline, the main auxiliary-energy pipeline and the main compressed air pipeline are fixed on the manifold system, and the manifold system includes at least one high and low pressure manifold skid.

For example, in the fracturing system provided by an embodiment of the present disclosure, the combustion-gas pipeline connects the N+M turbine fracturing devices of the first fracturing device group and the second fracturing device group in series, to provide combustion-gas to the N+M turbine fracturing devices, the compressed air pipeline connects the N+M o turbine fracturing devices of the first fracturing device group and the second fracturing device group in series, to provide compressed air to the N+M turbine fracturing devices, the auxiliary-energy pipeline connects the N+M turbine fracturing devices of the first fracturing device group and the second fracturing device group in series, to provide auxiliary-energy to the auxiliary devices of the N+M turbine fracturing devices.

For example, in the fracturing system provided by an embodiment of the present disclosure, the combustion-gas pipeline includes a first sub combustion-gas pipeline and a second sub combustion-gas pipeline, the first sub combustion-gas pipeline connects the N turbine fracturing devices of the first fracturing device group in series, to provide combustion-gas to the N turbine fracturing devices, the second sub combustion-gas pipeline connects the M turbine fracturing devices of the second fracturing device group in series, to provide combustion-gas to the M turbine fracturing devices, the compressed air pipeline includes a first sub compressed air pipeline and a second sub compressed air pipeline, the first sub compressed air pipeline connects the N turbine fracturing devices of the first fracturing device group in series, to provide compressed air to the N turbine fracturing devices, the second sub compressed air pipeline connects the M turbine fracturing devices of the second fracturing device group in series, to provide compressed air to the M turbine fracturing devices, and the auxiliary-energy pipeline includes a first sub auxiliary-energy pipeline and a second sub auxiliary-energy pipeline, the first sub-auxiliary-energy pipeline connects the N turbine fracturing devices of the first fracturing device group in series, to provide auxiliary-energy to the auxiliary devices of the N turbine fracturing devices, the second sub-auxiliary-energy pipeline connects the M turbine fracturing devices of the second fracturing device group in series, to provide auxiliary-energy to the auxiliary devices of the M turbine fracturing devices.

BRIEF DESCRIPTION OF THE DRAWINGS

In order to clearly illustrate the technical solution of the embodiments of the present disclosure, the drawings of the embodiments will be briefly described. It is apparent that the described drawings are only related to some embodiments of the present disclosure and thus are not limitative of the present disclosure.

DETAILED DESCRIPTION

In order to make objects, technical details and advantages of embodiments of the present disclosure clear, the technical solutions of the embodiments will be described in a clearly and fully understandable way in connection with the related drawings. It is apparent that the described embodiments are just a part but not all of the embodiments of the present disclosure. Based on the described embodiments herein, those skilled in the art can obtain, without any inventive work, other embodiment(s) which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the description and claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects listed after these terms as well as equivalents thereof, but do not exclude other elements or objects. The phrases "connect", "connected", etc., are not intended to define a physical connection or a mechanical connection, but may comprise an electrical connection which is direct or indirect.

Figure 1:
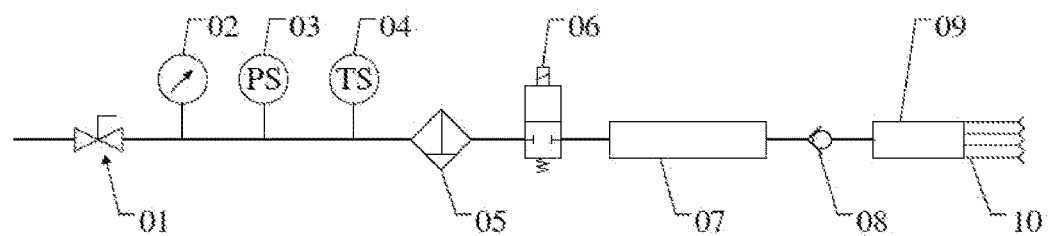
FIG. 1 is a schematic diagram of a combustion-gas supply system of a turbine fracturing vehicle.

FIG. 1 is a schematic diagram of a combustion-gas supply system of a turbine fracturing vehicle. As shown in FIG. 1, the combustion-gas supply system includes: a gas supply ball valve 01, a gas pressure gauge 02, a gas pressure sensor 03, a gas temperature sensor 04, a gas filter 05, a gas supply solenoid valve 06, a gas flow control valve 07, a turbine engine gas one-way valve 08 that are connected by pipeline and are arranged in sequence. In this way, in a case that the combustion-gas supply system is operating, gas can enter a corresponding pipeline through the gas supply ball valve 01; the gas pressure sensor 03 and the gas temperature sensor 04 can detect pressure parameters and temperature parameters of the combustion-gas; subsequently, after filtering out impurities through the gas filter 05, the filtered gas can reach a gas distribution valve block 09 of the turbine engine through the gas supply solenoid valve 06, the gas flow control valve 07, and the turbine engine gas one-way valve 08. The gas distribution valve block 09 may then distribute the gas to various nozzles 10 in a combustion chamber of the turbine engine for combustion.

The combustion-gas supply system shown in FIG. 1 can directly process wellhead gas generated by a fracturing wellhead by arranging the gas filter 05, and the processed wellhead gas is supplied to the turbine engine. Therefore, the combustion-gas supply system can utilize the wellhead gas generated at a well site, so that a greater economic benefit can be achieved. However, the above-mentioned combustion-gas supply system has the following shortcomings: (1) after the operation is completed, the combustion-gas supply system cannot discharge remaining combustion-gas in the combustion-gas supply system, therefore, it has potential safety hazards; (2) the entire combustion-gas supply system is provided with only one gas supply interface, in a case that the gas at the wellhead is insufficient, a pipeline in front of the balloon valve 01 can only be removed, then is replaced by another pipeline, so that on-site operation is complicated and inefficient; (3) before each operation, the combustion-gas supply system is not provided with a separate pressure test interface; (4) in a case that a plurality of turbine fracturing vehicles are provided at the well site in the form of a vehicle group, the combustion-gas supply systems of the two adjacent fracturing vehicles cannot be communicated, so that a pipeline connection of the well site is complicated, and the cost is also increased.

In this regard, at least one embodiment of the present disclosure provides a combustion-gas supply system, a combustion-gas supply method, a device equipped with a turbine engine, and a fracturing system. The combustion-gas supply system includes a main pipeline and a multi-functional pipeline; the main pipeline includes a first sub-pipeline and a second sub-pipeline that is connected with the first sub-pipeline; the first sub-pipeline includes a first gas intake pipe, a first gas supply valve and a first gas outlet pipe arranged in sequence, the first gas intake pipe is configured to input combustion-gas; the second sub-pipeline includes a gas supply valve and a gas supply pipe, the first gas outlet pipe is connected with the combustion-gas supply valve, the gas supply pipe is configured to be connected with a turbine engine, the multi-functional pipeline includes a second gas intake pipe, a second gas supply valve and a second gas outlet pipe arranged in sequence, the second gas outlet pipe is communicated with the first gas outlet pipe. In this way, the combustion-gas supply system can introduce high-pressure gas (for example, high-pressure air) from the first gas outlet pipe of the first sub-pipeline through the multi-functional pipeline, to discharge residual combustion-gas in the first sub-pipeline, so that safety of the combustion-gas supply system is improved, and difficulty and cost of the on-site operation are reduced; on the other hand, the combustion-gas supply system can also carry out a pressure test on the main pipeline before the operation through the multi-functional pipeline, safety hazards such as leakage of the main pipeline are eliminated in advance; the combustion-gas supply system can further supply combustion-gas through the multi-functional pipeline in a case that the gas in the main pipeline is insufficient, so that stable and continuous operation of the entire combustion-gas supply system is guaranteed.

Hereinafter, the combustion-gas supply system, the combustion-gas supply method, the device equipped with the turbine engine, and the fracturing system provided by the embodiments of the present disclosure will be described in detail with reference to the accompanying drawings.

Figure 2:
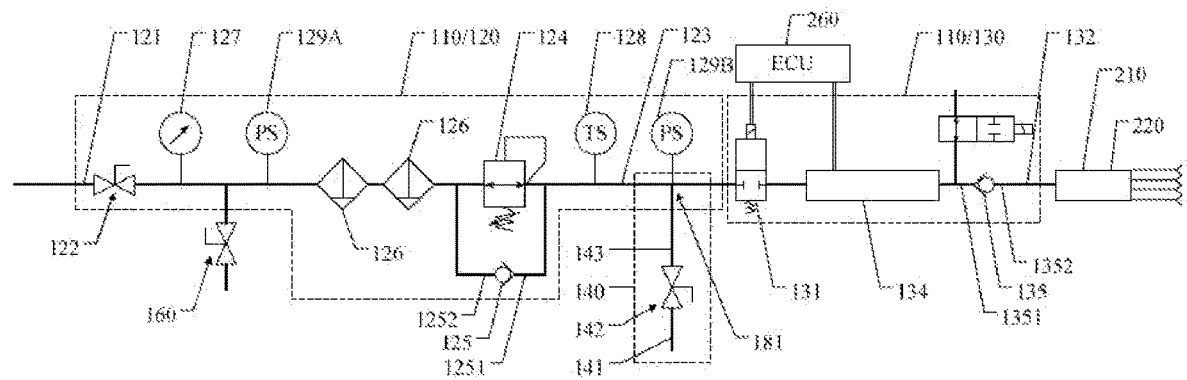
FIG. 2 is a schematic diagram of a combustion-gas supply system provided by an embodiment of the present disclosure.

FIG. 2 is a schematic diagram of a combustion-gas supply system provided by an embodiment of the present disclosure. As shown in FIG. 2, the combustion-gas supply system 100 includes a main pipeline 110, and the main pipeline 110 is used to supply combustion-gas directly to the turbine engine; the main pipeline 110 includes a first sub-pipeline 120 and a second sub-pipeline 130 that is connected with the first sub-pipeline 120; the first sub-pipeline 120 includes a first gas intake pipe 121, a first gas supply valve 122 and a first gas outlet pipe 123 arranged in sequence, the first gas intake pipe 121 is configured to input combustion-gas; the second sub-pipeline 130 includes a gas supply valve 131 and a gas supply pipe 132, the first gas outlet pipe 123 is connected with the combustion-gas supply valve 131, and the gas supply pipe 132 is configured to connect with the turbine engine.

As shown in FIG. 2, the combustion-gas supply system 100 further includes a multi-functional pipeline 140, the multi-functional pipeline 140 includes a second gas intake pipe 141, a second gas supply valve 142 and a second gas outlet pipe 143 arranged in sequence, and the second gas outlet pipe 143 is communicated with the first gas outlet pipe 123. It should be noted that, in the first sub-pipeline, the second sub-pipeline and the multi-functional pipeline mentioned above, other pipelines, other valves and other functional components may also be inserted between the pipelines, the valves and the functional components which are arranged in sequence, which are not limited in the embodiment of the present disclosure.

In the combustion-gas supply system provided by the embodiments of the present disclosure, because the second gas outlet pipe 143 of the multi-functional pipeline 140 is communicated with the first gas outlet pipe 123 of the first sub-pipeline 120, for example, which can be connected through a three-way connection; after one operation is completed, the second gas supply valve 142 of the multi-functional pipeline 140 can be opened, so that high-pressure gas (for example, high pressure air or compressed air) is introduced into the first gas outlet pipe 123 of the first sub-pipeline 120 through the multi-functional pipeline 140, in this case, because the combustion-gas supply valve 131 has been closed, the high-pressure gas introduced into the first gas outlet pipe 123 can flow to the first gas intake pipe 121, thus the residual combustion-gas in the first sub-pipeline 120 is discharged, so that the safety of the combustion-gas supply system 100 is improved, and the on-site operation difficulty and cost are reduced. On the other hand, before the operation, the combustion-gas supply system 100 can block the first gas intake pipe 121, then the high-pressure gas (for example, high pressure air or compressed air) is introduced into the first gas outlet pipe 123 of the first sub-pipeline 120 through the multi-functional pipeline 140, so that the pressure test can be performed on the first sub-pipeline 120, and safety hazards such as leakage of the main pipeline can be eliminated in advance. In addition, during the operation, in a case that the gas in the main pipeline 110 is insufficient, the combustion-gas supply system 100 can also supply combustion-gas through the multi-functional pipeline 140 to supplement the combustion-gas, so that stable and continuous operation of the entire combustion-gas supply system 100 is ensured.

For example, a pressure of the above-mentioned high-pressure gas is greater than one standard atmospheric pressure, that is, greater than 0.1 MPa.

For example, the above-mentioned gas may be natural gas, wellhead gas, or other gas that can be combusted by a turbine engine.

In some examples, as shown in FIG. 2, the first sub-pipeline 120 further includes a combustion-gas pressure regulating valve 124 and a bypass one-way valve 125; the combustion-gas pressure regulating valve 124 is located between the first gas supply valve 122 and the first gas outlet pipe 123; an input end 1251 of the bypass one-way valve 125 is communicated with the first gas outlet pipe 123, an output end 1252 of the bypass one-way valve 125 is located between the combustion-gas pressure regulating valve 124 and the first gas supply valve 122. The bypass one-way valve 125 is able to be flowed through in the direction from the input end 1251 to the output end 1252, and is not able to be flowed through in the direction from the output end 1252 to the input end 1251. With this arrangement, during operation, in a case that pressure of the combustion-gas is too high, the combustion-gas pressure regulating valve 124 can decompress the gas, so that pressure of the decompressed gas matches gas supply pressure of the turbine engine, and thus the safety of the combustion-gas supply system can be further improved. On the other hand, in a case that high-pressure gas is introduced into the first gas outlet pipe 123 of the first sub-pipeline 120 by using the multi-functional pipe 140 to discharge the residual combustion-gas in the first sub-pipeline 120, because the combustion-gas pressure regulating valve 124 is turned off, the high pressure gas cannot enter the first gas intake pipe 121 from the combustion-gas pressure regulating valve 124, by arranging the bypass one-way valve 125, the high-pressure gas can enter the first gas intake pipe 121, so that the residual combustion-gas in the first sub-pipeline 120 is discharged.

In some examples, as shown in FIG. 2, the first sub-pipeline 120 further includes at least one gas filter 126 and a gas source pressure gauge 127; the gas filter 126 is located between the first gas supply valve 122 and the combustion-gas pressure regulating valve 124; the gas source pressure gauge 127 is located between the first gas supply valve 122 and the gas filter 126; in this case, the output end 1252 of the bypass one-way valve 125 is located between the gas filter 126 and the combustion-gas pressure regulating valve 124.

In the combustion-gas supply system provided in the example, the combustion-gas input from the first gas intake pipe 121 may be filtered and processed through at least one gas filter 160, thus the combustion-gas supply system 100 can directly utilize wellhead gas, so that economic benefit can be greatly improved. In addition, due to problems such as unstable pressure and unstable supply of wellhead gas, the combustion-gas supply system 100 provided by the embodiment of the present disclosure can supply combustion-gas to the main pipeline 110 through the above-mentioned multi-functional pipeline 140 in a case that the wellhead gas is insufficient, so that stable and continuous operation of the entire combustion-gas supply system 100 is ensured. For example, the first gas intake pipe 121 is configured to connect the wellhead gas, the second gas intake pipe 141 of the multi-functional pipeline 140 is configured to be connected with a natural gas supply device, such as a natural gas storage tank. In addition, the gas source pressure gauge 127 can detect pressure of the combustion-gas input into the first gas intake pipe 121, so as to monitor the input gas. In addition, the gas source pressure gauge 127 can present the pressure of the combustion-gas input in the first gas intake pipe 121 in a visualized manner, to facilitate monitoring by on-site personnel.

Figure 3:
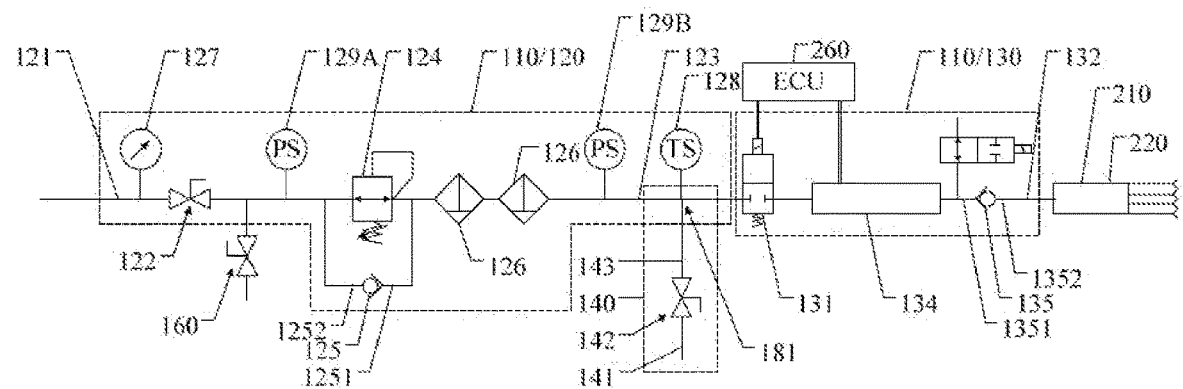
FIG. 3 is a schematic diagram of another combustion-gas supply system provided by an embodiment of the present disclosure.

It should be noted that, although the gas source pressure gauge 127 shown in FIG. 2 is located between the first gas supply valve 122 and the gas filter 126, the arrangement of the gas source pressure gauge 127 in the combustion-gas supply system provided by the embodiment of the present disclosure is not limited thereto. FIG. 3 is a schematic diagram of another combustion-gas supply system provided by an embodiment of the present disclosure. As shown in FIG. 3, the gas source pressure gauge 127 can also be arranged between the first gas intake pipe 121 and the first gas supply valve 122.

In some examples, as shown in FIGS. 2 and 3, the first sub-pipeline 120 includes two gas filters 126, so that redundancy of the gas filters 126 can be improved, and the safety can be improved. Of course, the embodiments of the present disclosure include but are not limited thereto, a number of the gas filters can also be set according to actual requirements.

In some examples, as shown in FIG. 2, the gas filter 126 is located between the first gas supply valve 122 and the combustion-gas pressure regulating valve 124; however, the embodiments of the present disclosure include but are not limited thereto, as shown in FIG. 3, the gas filter 126 may also be arranged on a side of the combustion-gas pressure regulating valve 124 away from the first gas supply valve 122, that is, the input end 1251 of the bypass one-way valve 125.

In some examples, as shown in FIG. 2, the first sub-pipeline 120 further includes a first pressure sensor 129A, the first pressure sensor 129A is between the first gas supply valve 122 and the gas filter 126, and the first pressure sensor 129A is configured to monitor supply pressure in real time. For example, the pressure value detected by the first pressure sensor 129A may be sent to a local control terminal or a remote control terminal in a wired manner or a wireless manner.

In some examples, as shown in FIG. 2, the combustion-gas supply system 100 further includes a blowdown valve 160; and the blowdown valve 160 is between the first gas supply valve 122 and the combustion-gas pressure regulating valve 124, and a height of the blowdown valve 160 is smaller than a height of the main pipeline 110. It should be noted that, the above-mentioned height is a height with respect to the horizontal plane. In this way, the combustion-gas supply system 100 can discharge sundries in the main pipeline 110, such as condensed water, through the blowdown valve 160. It should be noted that, for better sewage discharge, the height of the blowdown valve 160 is also smaller than a height of a part of the gas delivery pipe where the blowdown valve 160 is located close to the first gas intake pipe 121. It should be noted that, the embodiments of the present disclosure include but are not limited thereto, and the blowdown valve may also be arranged at other suitable positions.

In some examples, the main pipeline 110 and the multi-functional pipeline 140 may be substantially on a same plane, and the blowdown valve 160 is not located in the plane. In this way, in a case that the combustion-gas supply system is installed, a height of the blowdown valve 160 can be conveniently arranged to be less than a height of the main pipeline 110.

In some examples, as shown in FIGS. 2 and 3, the first sub-pipeline 120 further includes: a gas temperature sensor 128 and a second pressure sensor 129B; the gas temperature sensor 128 is located on the first gas outlet pipe 123 and is configured to detect temperature of the combustion-gas in the first gas outlet pipe 123; the second pressure sensor 129B is located on the first gas outlet pipe 123 and is configured to detect pressure of the combustion-gas in the first gas outlet pipe 123. In this way, the gas temperature sensor 128 and the second pressure sensor 129B can detect the temperature and pressure of the combustion-gas in the first gas outlet pipe 123, that is, the temperature and pressure of the combustion-gas entering the second sub-pipeline 130.

It should be noted that, the embodiment of the present disclosure does not limit an arranging order of the gas temperature sensor 128 and the second pressure sensor 129B; as shown in FIG. 2, the gas temperature sensor 128 may be arranged on a side of the second pressure sensor 129B close to the first gas intake pipe 121; as shown in FIG. 3, the gas temperature sensor 128 may be arranged on a side of the second pressure sensor 129B away from the first gas intake pipe 121.

For example, a temperature value detected by the gas temperature sensor 128 and a pressure value detected by the second pressure sensor 129B may be sent to a local control terminal or a remote control terminal in a wired manner or a wireless manner.

In some examples, as shown in FIGS. 2 and 3, a connection position of the second gas outlet pipe 143 of the multi-functional pipeline 140 and the first gas outlet pipe 123 of the first sub-pipeline 120 can be arranged with a three-way connection 181; in this case, the gas temperature sensor 128 or the second pressure sensor 129B may be arranged at a position where the three-way connection 181 is located. Of course, the embodiments of the present disclosure include but are not limited thereto, the gas temperature sensor 128 and the gas pressure sensor 129 can also be both arranged on a side of the three-way connection 181 close to the first gas intake pipe 121, or a side of the three-way connection 181 away from the first gas intake pipe 121, or the gas temperature sensor 128 and the gas pressure sensor 129 are arranged on two sides of the three-way connection 181 respectively.

In some examples, as shown in FIGS. 2 and 3, the second sub-pipeline 130 further includes a flow control valve 134 and a gas one-way valve 135; the flow control valve 134 is located between the combustion-gas supply valve 131 and the gas supply pipe 132; an input end 1351 of the gas one-way valve 135 is connected with the flow control valve 134, an output end 1352 of the gas one-way valve 1352 is communicated with the gas supply pipe 132. In this way, the flow control valve 134 can control the flow of the gas, and the gas one-way valve can prevent backflow of the gas in the turbine engine.

In some examples, as shown in FIGS. 2 and 3, the combustion-gas supply valve 131 and the flow control valve 134 may be solenoid valves, and are electrically or communicatively connected with a control unit 260 (ECU) of the turbine engine. In this way, the opening, the closing, and the opening degree of the combustion-gas supply valve 131 and the flow control valve 134 can be controlled by a control unit 260 (ECU) of the turbine engine. For example, the control unit (ECU) of the turbine engine may determine the opening degree of the flow control valve 134 according to a level of a rotational speed. It should be noted that, the above-mentioned electrically connection refers to a connection through a signal line, the above-mentioned communicatively connection includes a case of being connected by a signal line, and also includes a case of being connected by a wireless manner (for example, a wireless manner such as Wifi, radio frequency, mobile network, etc.).

In some examples, as shown in FIGS. 2 and 3, the gas supply pipe 132 can be connected with a gas distribution valve block 210 of the turbine engine, and the gas distribution valve block 210 may then distribute the gas to various nozzles 220 within a combustion chamber of the turbine engine for combustion.

In some examples, as shown in FIGS. 2 and 3, the second sub-pipeline 130 further includes: a gas discharge valve 137, which is located between the combustion-gas supply valve 131 and the gas one-way valve 135. After one operation is completed, the gas discharge valve 137 can be used to discharge residual combustion-gas in the second sub-pipeline.

In some examples, the first gas supply valve 122, the second gas supply valve 142, and the blowdown valve 160 may adopt ball valves. Of course, the embodiments of the present disclosure include but are not limited thereto, the first gas supply valve 122, the second gas supply valve 142 and the blowdown valve 160 may also adopt other types of valves.

Figure 4:
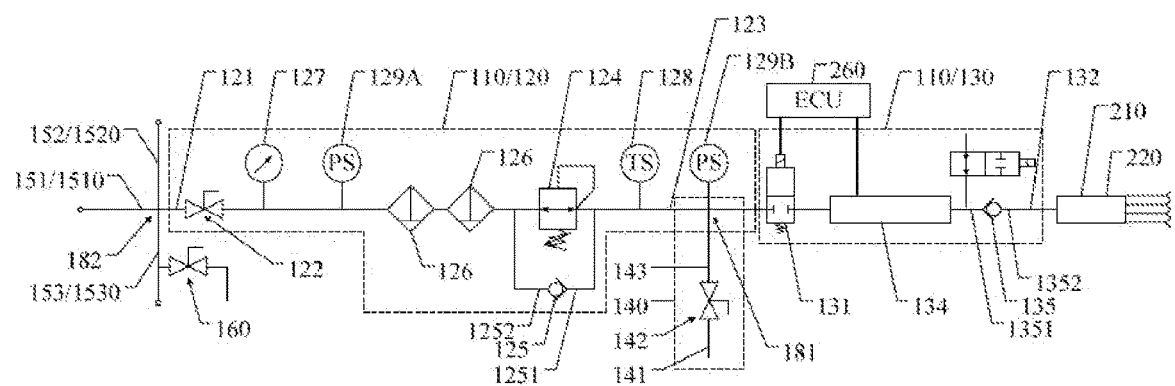
FIG. 4 is a schematic diagram of another combustion-gas supply system provided by an embodiment of the present disclosure.

FIG. 4 is a schematic diagram of another combustion-gas supply system provided by an embodiment of the present disclosure. As shown in FIG. 4, the combustion-gas supply system 100 further includes a main pipeline 110 and a multi-functional pipeline 140; the main pipeline 110 is used to supply combustion-gas directly to the turbine engine; the main pipeline 110 includes a first sub-pipeline 120 and a second sub-pipeline 130 connected with the first sub-pipeline 120; the first sub-pipeline 120 includes a first gas intake pipe 121, a first gas supply valve 122 and a first gas outlet pipe 123 arranged in sequence, the first gas intake pipe 121 is configured to input gas; the second sub-pipeline 130 includes a gas supply valve 131 and a gas supply pipe 132, the first gas outlet pipe 123 is connected with the combustion-gas supply valve 131, the gas supply pipe 132 is configured to connect with the turbine engine; the multi-functional pipeline 140 includes a second gas intake pipe 141, a second gas supply valve 142 and a second gas outlet pipe 143 arranged in sequence, and the second gas outlet pipe 143 is communicated with the first gas outlet pipe 123.

As shown in FIG. 4, the combustion-gas supply system 100 further includes: a first gas supply interface 151, a second gas supply interface 152 and a third gas supply interface 153; the first gas supply interface 151 includes a first gas delivery pipe 1510, the first gas delivery pipe 1510 is communicated with the first gas intake pipe 121; the second gas supply interface 152 includes a second gas delivery pipe 1520, the second gas delivery pipe 1520 is communicated with the first gas intake pipe 121; the third gas supply interface 153 includes a third gas delivery pipe 1530, the third gas delivery pipe 1530 is communicated with the first gas intake pipe 121; pipe diameters of the second gas delivery pipe 1520 and the third gas delivery pipe 1530 are larger than a pipe diameter of the first gas delivery pipe 1510, the pipe diameters of the second gas delivery pipe 1520 and the third gas delivery pipe 1530 are larger than a pipe diameter of the first gas intake pipe 121. In this way, in the combustion-gas supply system 100, the first gas supply interface 151, the second gas supply interface 152 and the third gas supply interface 153 can all be used to supply combustion-gas to the first gas intake pipe 121; when an air supply volume or a gas supply pressure of any one of the first gas supply interface 151, the second gas supply interface 152 and the third gas supply interface 153 is insufficient, gas can be quickly supplied to the first gas intake pipe 121 through the other two gas supply interfaces. In addition, because the pipe diameters of the second gas delivery pipe 1520 and the third gas delivery pipe 1530 are larger than the pipe diameter of the first gas delivery pipe 1510, a plurality of combustion-gas supply systems 100 can achieve series operation by connecting the third gas supply interface 153 of one of two adjacent combustion-gas supply systems 100 with the second gas supply interface 152 of the other of the two adjacent combustion-gas supply systems 100.

For example, both the pipe diameter of the second gas delivery pipe 1520 and the pipe diameter of the third gas delivery pipe 1530 are greater than or equal to two times of the pipe diameter of the first gas delivery pipe 1510. For example, in a case that the diameter of the first gas delivery pipe 1510 is 2 inches, the diameters of the second gas delivery pipe 1520 and the third gas delivery pipe 1530 may be greater than or equal to 4 inches.

For example, as shown in FIG. 4, the first gas delivery pipe 1510, the second gas delivery pipe 1520 and the third gas delivery pipe 1530 can be connected with the first gas intake pipe 121 through a four-way connection 182.

In some examples, as shown in FIG. 4, the combustion-gas supply system 100 further includes a blowdown valve 160, the blowdown valve 160 is located on at least one of the first gas delivery pipe 1510, the second gas delivery pipe 1520 and the third gas delivery pipe 1530, and a height of the blowdown valve 160 is less than a height of the main pipeline 110. In this way, the combustion-gas supply system 100 can discharge the sundries in the main pipeline 110, such as condensed water, through the blowdown valve 160. It should be noted that, in order to better discharge sewage, the height of the blowdown valve 160 is also smaller than the height of a part of the gas delivery pipe where the blowdown valve 160 is located close to the first gas intake pipe 121.

For example, the main pipeline 110 and the multi-functional pipeline 140 may be substantially on a same plane, and the blowdown valve 160 is not located in the plane. In this way, in a case that the combustion-gas supply system is installed, the height of the blowdown valve 160 can be conveniently arranged to be less than the height of the main pipeline 110.

For example, as shown in FIG. 4, the blowdown valve 160 is located on the third gas delivery pipe 1530; of course, the embodiments of the present disclosure include but are not limited thereto, and the blowdown valve can also be located on the first gas delivery pipe or the second gas delivery pipe.

An embodiment of the present disclosure further provides a combustion-gas supply method of a combustion-gas supply system, the combustion-gas supply system may be a combustion-gas supply system provided by any of the above examples. The combustion-gas supply method includes: before supplying combustion-gas, opening the second gas supply valve, and introducing a first high-pressure gas into the first sub-pipeline through the multi-functional pipeline, to test pressure of the first sub-pipeline; and after the operation is completed, opening the second gas supply valve, and introducing a second high-pressure gas into the first sub-pipeline through the multi-functional pipeline, to discharge residual combustion-gas in the first sub-pipeline from the first gas intake pipe.

In the combustion-gas supply method provided by the embodiment of the present disclosure, before the operation, the first high-pressure gas (for example, high-pressure air) can be introduced into the first gas outlet pipe of the first sub-pipeline through the multi-functional pipeline, so that a pressure test can be performed on the first sub-pipeline, and safety hazards such as leakage of the main pipeline can be discharged in advance; after the operation, the second high-pressure gas can be introduced through the multi-functional pipeline, to discharge the residual combustion-gas in the first sub-pipeline, so that the safety of the combustion-gas supply system is improved, and the difficulty and cost of on-site operation are reduced.

It should be noted that, the above-mentioned first high-pressure gas and second high-pressure gas may be a same kind of gas, or may be different types of gas. In addition, pressures of the first high-pressure gas and the second high-pressure gas may be the same or different from each other, as long as the pressures are greater than 0.1 Mpa. Of course, in order to simplify the whole system and reduce the cost, the first high pressure gas and the second high pressure gas can both be compressed air.

In some examples, the combustion-gas supply method further includes: during operation, in a case that pressure of combustion-gas in the first gas outlet pipe is less than a preset value, opening the second gas supply valve, and introducing combustion-gas into the first gas outlet pipe through the multi-functional pipeline, so that the stable and continuous operation of the entire combustion-gas supply system is guaranteed. In particular, in a case that the combustion-gas supply system uses wellhead gas as the gas, due to the problems that the pressure of the wellhead gas is unstable and the supply of the wellhead gas is unstable, the combustion-gas supply method can supply combustion-gas to the main pipeline through the above-mentioned multi-functional pipeline in a case that the wellhead gas is insufficient, so that the stable and continuous operation of the entire combustion-gas supply system is guaranteed.

For example, the pressure of combustion-gas in the first gas outlet pipe can be detected by the second pressure sensor, then it is judged whether the pressure of combustion-gas is less than the preset value.

In some examples, the combustion-gas supply method further includes: connecting the first gas intake pipe to the wellhead gas, and connecting the second gas intake pipe of the multi-functional pipeline to the natural gas supply device, such as a natural gas storage tank.

In some examples, a plurality of combustion-gas supply systems can be arranged, referring to FIG. 4, the combustion-gas supply system 100 further includes: a first gas supply interface 151, a second gas supply interface 152 and a third gas supply interface 153; the first gas supply interface 151 includes a first gas delivery pipe 1510, and the first gas delivery pipe 1510 is communicated with the first gas intake pipe 121; the second gas supply interface 152 includes a second gas delivery pipe 1520, and the second gas delivery pipe 1520 is communicated with the first gas intake pipe 121; the third gas supply interface 153 includes a third gas delivery pipe 1530, and the third gas delivery pipe 1530 is communicated with the first gas intake pipe 121; both a pipe diameter of the second gas delivery pipe 1520 and a pipe diameter of the third gas delivery pipe 1530 are larger than a pipe diameter of the first gas delivery pipe 1510, both the pipe diameter of the second gas delivery pipe 1520 and the pipe diameter of the third gas delivery pipe 1530 are larger than a pipe diameter of the first gas intake pipe 121. In this case, the combustion-gas supply method further includes: connecting a third gas supply interface in one of two adjacent combustion-gas supply systems with a second gas supply interface in the other one of the two combustion-gas supply systems, to connect the plurality of combustion-gas supply systems in series.

In some examples, the combustion-gas supply system further includes: a blowdown valve, which is located on at least one of the first gas delivery pipe, the second gas delivery pipe and the third gas delivery pipe, a height of the blowdown valve is less than the height of the main pipeline; the combustion-gas supply method further includes: opening the blowdown valve to discharge sundries in the main pipeline.

Hereinafter, the combustion-gas supply method will be specifically described by taking the combustion-gas supply system shown in FIG. 4 as an example. It is worth noting that, the combustion-gas supply method provided by the embodiments of the present disclosure includes but is not limited to the following specific execution steps.

In some examples, in a case that the combustion-gas supply system adopts the combustion-gas supply system shown in FIG. 4, the combustion-gas supply method may include: before the operation, connecting the second gas intake pipe 1411 of the multi-functional pipeline 140 to a pressure test pipeline, blocking the first gas supply interface 151, the second gas supply interface 152 and the third gas supply interface 153 with plugs, closing the blowdown valve 160, opening the first gas supply valve 122, and ensuring that the combustion-gas supply valve 131 is in a closed state; then opening the second gas supply valve 142, and introducing high-pressure gas into the first sub-pipeline 120 through the multi-functional pipeline 140, so that a pressure test is performed on the first sub-pipeline 120, and safety hazards such as leakage of the main pipeline are discharged in advance.

In some examples, in a case that the combustion-gas supply system adopts the combustion-gas supply system shown in FIG. 4, the combustion-gas supply method may include: during operation, connecting one of the first gas supply interface 151, the second gas supply interface 152 and the third gas supply interface 153 with a combustion-gas source, blocking the other two gas supply interfaces with plugs, then adjusting the gas source pressure to a gas supply pressure (typically 250 psi) required by the turbine engine through the combustion-gas pressure regulating valve 124, and starting the turbine engine for work in a case that everything is ready.

In some examples, in a case that the combustion-gas supply system adopts the combustion-gas supply system shown in FIG. 4, the combustion-gas supply method may include: during operation, if the gas source (such as the wellhead gas) is insufficient, the gas pressure sensor 129 detects that the gas supply pressure is low, connecting the second gas intake pipe 141 with a backup gas source (for example, a natural gas storage tank), opening the second gas supply valve 142, thus backup gas enters the first sub-pipeline 120 through the multi-functional pipeline 140, so that the backup air source can supplement the air supply of the turbine engine.

In some examples, in a case that the combustion-gas supply system adopts the combustion-gas supply system shown in FIG. 4, the combustion-gas supply method may include: after the operation is completed, ensuring that the second gas supply valve 142 is in a closed state, connecting the second gas intake pipe 141 with a compressed air source, and connecting one of the first gas supply interface 151, the second gas supply interface 152 and the third gas supply interface 153 with a special container for collecting gas; after the connection is completed, opening the second gas supply valve 142, thus the high-pressure gas enters the first sub-pipeline 120 through the multi-functional pipeline 140, so that the gas remaining in the first sub-pipeline 120 in this case is replaced, and is discharged from the first gas supply interface 151.

In some examples, in a case that the combustion-gas supply system adopts the combustion-gas supply system shown in FIG. 4, the combustion-gas supply method may include: after the remaining combustion-gas in the first sub-pipeline 120 is replaced, opening the blowdown valve 160, to remove the sundries in the first sub-pipeline 120, such as condensed water.

Figure 5:
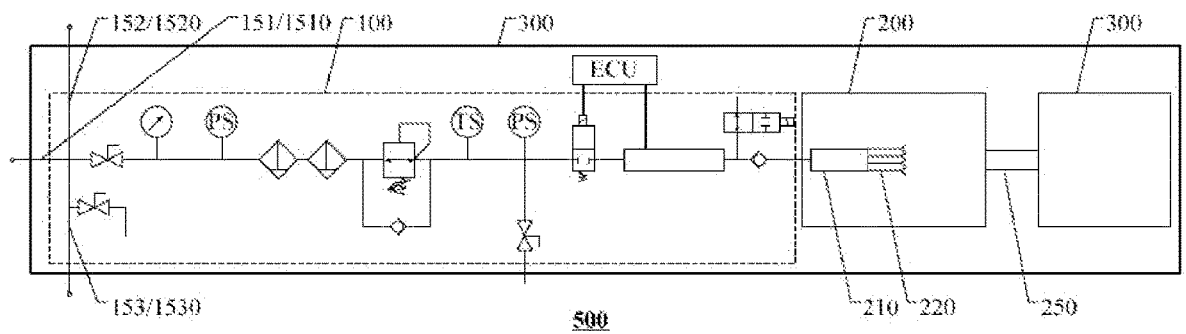
FIG. 5 is a schematic diagram of a device equipped with a turbine engine provided by an embodiment of the present disclosure.

An embodiment of the present disclosure further provides a device equipped with a turbine engine. FIG. 5 is a schematic diagram of a device equipped with a turbine engine provided by an embodiment of the present disclosure. As shown in FIG. 5, the device 500 includes a turbine engine 200 and a combustion-gas supply system 100; the combustion-gas supply system 100 may be a combustion-gas supply system provided by any one of the above examples. The turbine engine 200 includes a fuel nozzle 220, and the gas supply pipe 132 is configured to provide fuel gas to the fuel nozzle 220.

In some examples, as shown in FIG. 5, the device 500 further includes: a plunger pump 300, which is connected with an output shaft 250 of the turbine engine 200, and is configured to pressurize liquid using the power output by the turbine engine 200. For example, the plunger pump 300 may pressurize fracturing fluid, then the pressurized fracturing fluid can be injected into the wellhead for fracturing operation.

In some examples, as shown in FIG. 5, the device 500 can be a mobile fracturing device, which includes a vehicle 510; in this case, the fuel combustion-gas supply system 100 further includes a first gas supply interface 151, a second gas supply interface 152 and a third gas supply interface 153; the first gas supply interface 151 includes a first gas delivery pipe 1510, which is connected with the first gas intake pipe 121; the second gas supply interface 152 includes a second gas delivery pipe 1520, which is connected with the first gas intake pipe 121; the third gas supply interface 153 includes a third gas delivery pipe 1530, which is connected with the first gas intake pipe 121; both a pipe diameter of the second gas delivery pipe 1520 and a pipe diameter of the third gas delivery pipe 1530 are larger than a pipe diameter of the first gas delivery pipe 1510, and the pipe diameter of the second gas delivery pipe 1520 and the pipe diameter of the third gas delivery pipe 1530 are larger than a pipe diameter of the first gas intake pipe 121.

As shown in FIG. 5, the second gas supply interface 152 and the third gas supply interface 153 are located on two sides of the vehicle 510, respectively. In this way, in a case that a plurality of mobile fracturing devices are operated in a group, because the second gas supply interface 152 and the third gas supply interface 153 are located on two sides of the vehicle 510, respectively, so that it is convenient to connect a plurality of combustion-gas supply systems 100 in series, thus the pipeline on site is simplified. It should be noted that, the two sides of the above vehicle refer to opposite sides in a direction perpendicular to an extension direction of a girder of the vehicle, or opposite sides in a direction perpendicular to an extension direction of the main pipeline of the combustion-gas supply system.

Figure 6:
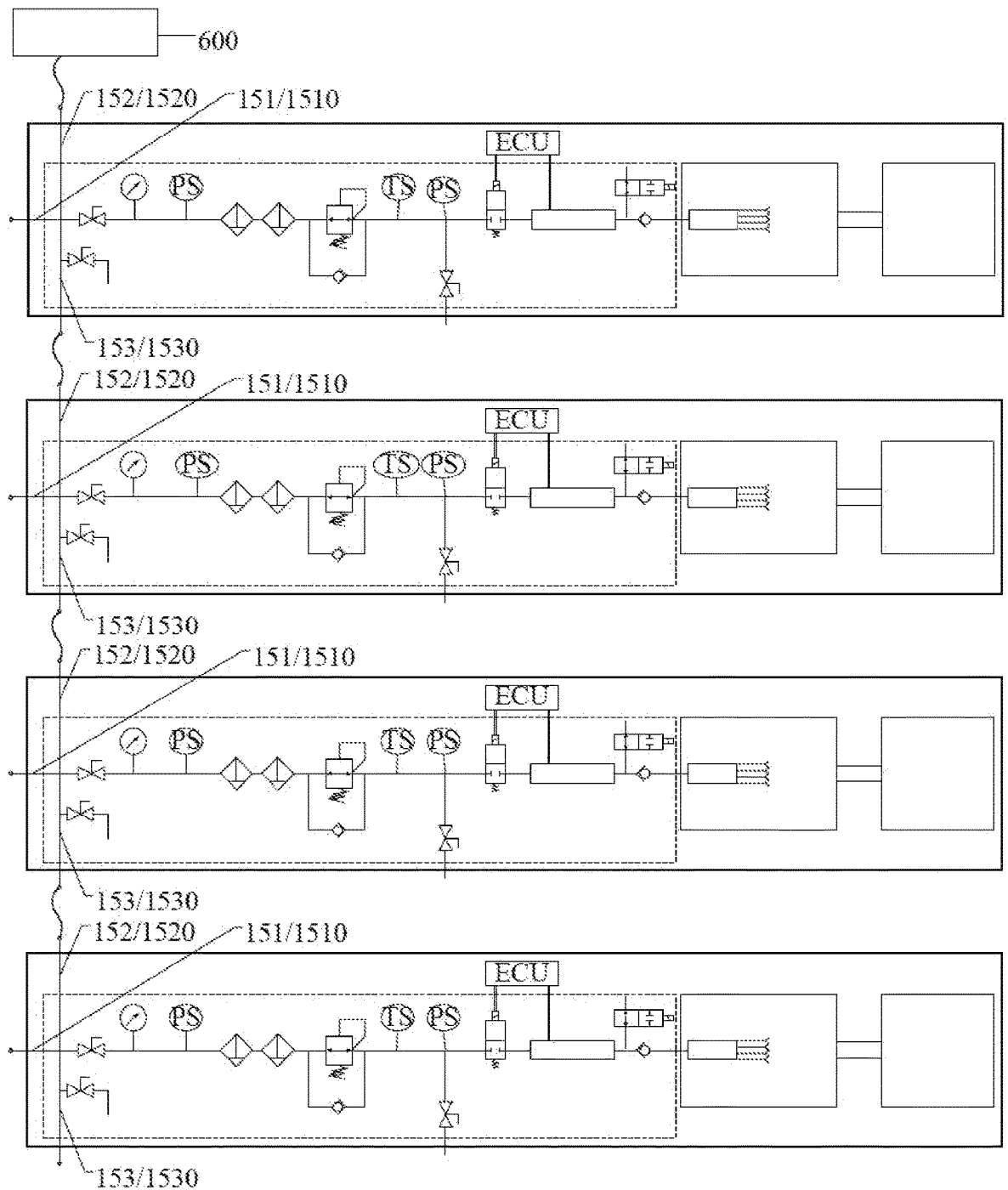
FIG. 6 is a schematic diagram of another device equipped with a turbine engine working in groups provided by an embodiment of the present disclosure.

FIG. 6 is a schematic diagram of a device equipped with a turbine engine working in groups provided by an embodiment of the present disclosure. As shown in FIG. 6, the device 500 equipped with a turbine engine can be a turbine fracturing vehicle; four turbine fracturing vehicles 500 are arranged in turn and form a vehicle group; a second gas supply interface 152 of a turbine fracturing vehicle 500 (for example, the first turbine fracturing vehicle) in the vehicle group nearest to a gas source 600 (for example, a wellhead) is connected with the gas source, a third gas supply interface 153 of the turbine fracturing vehicle 500 closest to the gas source (for example, the wellhead) in the vehicle group is connected with a second gas supply interface 152 of an adjacent turbine fracturing vehicle 500 (for example, a second turbine fracturing vehicle); a third gas supply interface 153 of a second turbine fracturing vehicle 500 is connected with the second gas supply interface 152 of an adjacent turbine fracturing vehicle 500 (for example, a third turbine fracturing vehicle); a third gas supply interface 153 of the third turbine fracturing vehicle 500 is connected with a second gas supply interface 152 of an adjacent turbine fracturing vehicle 500 (for example, a fourth turbine fracturing vehicle). In this way, the four turbine fracturing vehicles 500 can realize series operation.

Figure 7:
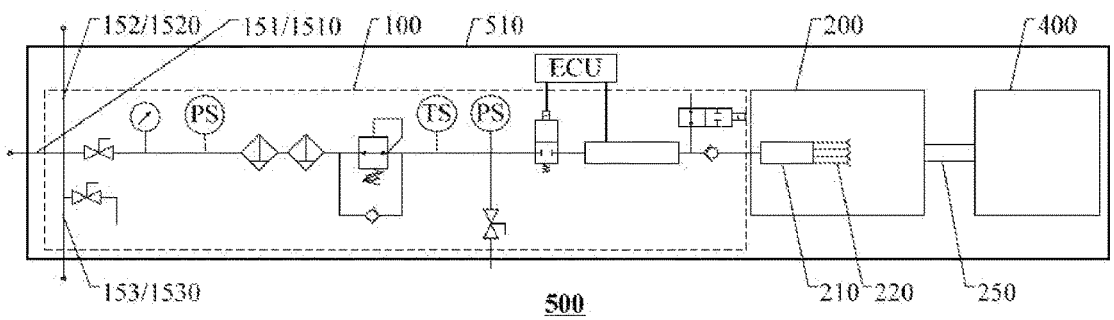
FIG. 7 is a schematic diagram of another device equipped with a turbine engine provided by an embodiment of the present disclosure.

FIG. 7 is a schematic diagram of another device equipped with a turbine engine provided by an embodiment of the present disclosure. As shown in FIG. 7, the device 500 further includes a power generator 400, which is connected with an output shaft 250 of the turbine engine 200, and is configured to use power output by the turbine engine 200 to generate electricity.

In fracturing operations, in order to provide greater displacement and achieve higher efficiency, a plurality of fracturing devices are grouped for operation. The fracturing devices themselves need to suck in low-pressure fracturing fluid, and discharge high-pressure fracturing fluid, thus various liquid pipelines are required for transportation; on the other hand, each of the fracturing devices requires substances and energy such as fuel (such as natural gas), compressed air, and auxiliary-energy (such as electricity, diesel, etc.), and these substances and energy also need pipelines to transport. In this case, the pipeline including a plurality of fracturing devices grouped are very complicated, and high-pressure fluid, fuel, compressed air and auxiliary-energy are dangerous to device and personnel, thus a reasonable, efficient and clean pipeline system is necessary to be designed, to carry out safety management and device maintenance, so that safety accidents are avoided.

Figure 8:
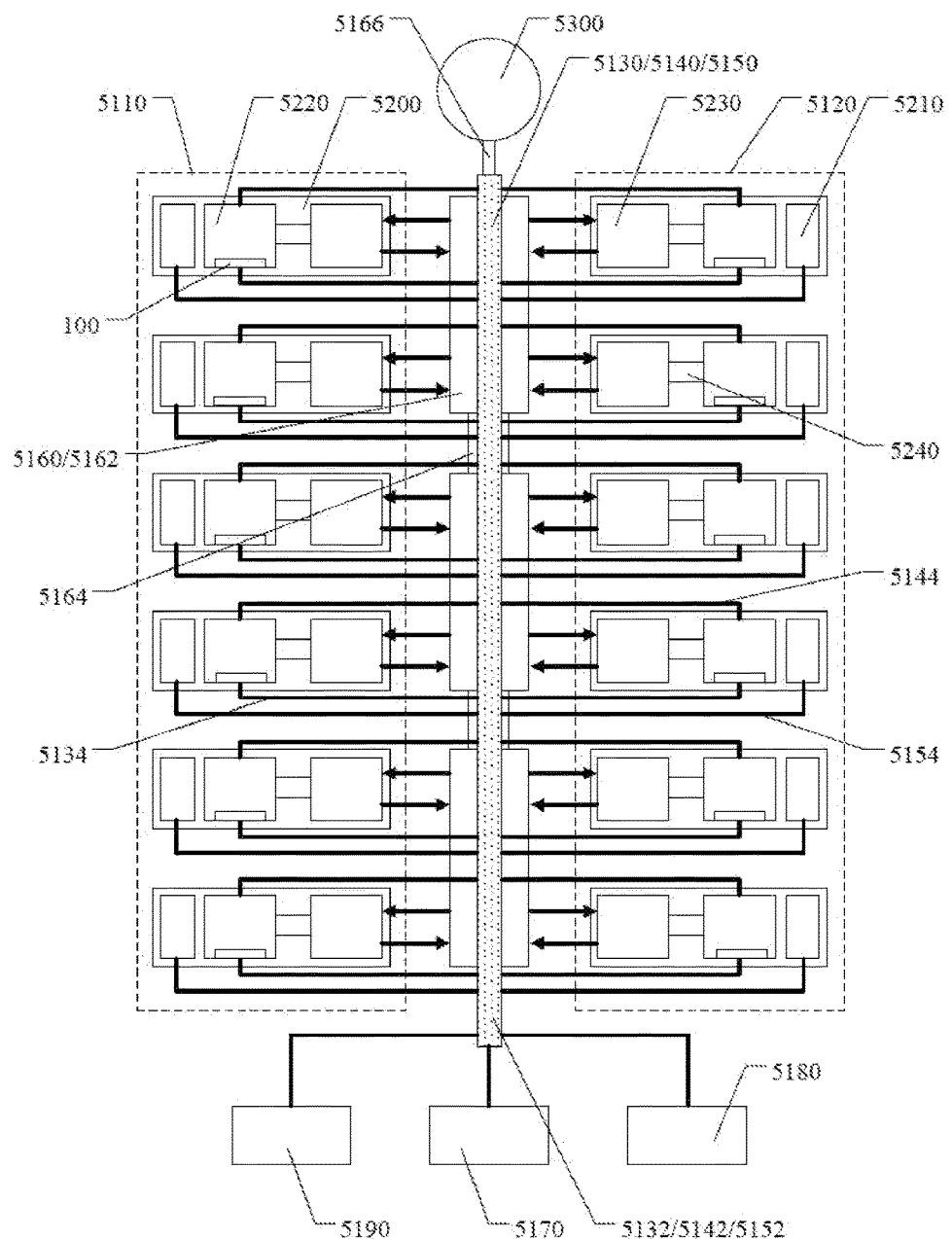
FIG. 8 is a schematic diagram of a fracturing system provided by an embodiment of the present disclosure.

An embodiment of the present disclosure provides a fracturing system. FIG. 8 is a schematic diagram of a fracturing system provided by an embodiment of the present disclosure.

As shown in FIG. 8, the fracturing system 5100 includes a first fracturing device group 5110, a second fracturing device group 5120, a combustion-gas pipeline 5130, a compressed air pipeline 5140 and an auxiliary-energy pipeline 5150; the first fracturing device group 5110 includes N turbine fracturing devices 5200; the second fracturing device group 5120 includes M turbine fracturing devices 5200; the combustion-gas pipeline 5130 is respectively connected with the first fracturing device group 5110 and the second fracturing device group 5120, and is configured to supply combustion-gas to the N+M turbine fracturing devices 5200; the compressed air pipeline 5140 is respectively connected with the first fracturing device group 5110 and the second fracturing device group 5120, and is configured to provide compressed air to the N+M turbine fracturing devices 5200; each of the turbine fracturing devices 5200 includes an turbine engine 5220 an auxiliary device 5210, and the auxiliary-energy pipeline 5150 is respectively connected with the first fracturing device group 5110 and the second fracturing device group 5120, and is configured to provide auxiliary-energy to the auxiliary devices 210 of the N+M turbine fracturing devices 200, in which N and M are positive integers greater than or equal to 2, respectively.

In the fracturing system provided by an embodiment of the present disclosure, the fracturing system includes a first fracturing device group and a second fracturing device group, the first fracturing device group includes N turbine fracturing devices, the second fracturing device group includes M turbine fracturing devices, in this way, the fracturing system can utilize a plurality of turbine fracturing devices grouped for fracturing operations, so that displacement and efficiency can be improved. On the other hand, the fracturing system further integrates the combustion-gas pipeline, compressed air pipeline and auxiliary-energy pipeline of the plurality of turbine fracturing devices, so that it is convenient to carry out safety management and device maintenance, and safety accidents are avoided.

In some examples, each of the turbine fracturing devices 5200 mentioned above includes a turbine engine and a combustion-gas supply system 100 described in any one of the above combustion-gas supply systems, the combustion-gas supply system 100 is connected with the combustion-gas pipeline 5130, and is configured to provide combustion-gas to the turbine engine.

In some examples, as shown in FIG. 8, the values of M and N may be equal, for example, both are 6. Of course, the embodiments of the present disclosure include but are not limited thereto, the values of M and N may also be unequal.

In some examples, as shown in FIG. 8, the auxiliary device 5210 of each of the turbine fracturing devices 5200 includes a diesel engine, the auxiliary-energy pipeline 5150 is configured to deliver diesel fuel.

In some examples, the auxiliary device may further include an oil pump, a hydraulic system, and a hydraulic motor; the diesel engine can drive the oil pump, thereby driving the hydraulic system; the hydraulic system drives the hydraulic motor to complete various auxiliary tasks, such as, starting the turbine engine, driving a radiator to work, etc. Of course, the embodiments of the present disclosure include but are not limited thereto, the auxiliary device may further include a lubricating system and a lubricating oil pump, the diesel engine can drive the lubricating oil pump, thereby driving the lubricating system to work.

In some examples, as shown in FIG. 8, the auxiliary device 5210 of each of the turbine fracturing devices 5200 includes an electric motor, and the auxiliary-energy pipeline 5150 is configured to deliver electrical power.

In some examples, the auxiliary device may further include an oil pump, a hydraulic system, and a hydraulic motor; the electric motor can drive the oil pump, thereby driving the hydraulic system; the hydraulic system drives the hydraulic motor to complete various auxiliary tasks, such as starting the turbine engine, driving the radiator, etc. Of course, the embodiments of the present disclosure include but are not limited thereto, the auxiliary device may also include a lubricating system and a lubricating oil pump, the electric motor drives the lubricating oil pump, thereby driving lubrication.

In some examples, as shown in FIG. 8, each of the turbine fracturing devices 5200 includes a turbine engine 5220, a fracturing pump 5230 and a transmission mechanism 5240; the turbine engine 5220 is connected with the fracturing pump 230 through the transmission mechanism 5240.

In some examples, as shown in FIG. 8, the combustion-gas pipeline 5130 is configured to provide fuel, such as natural gas, to the turbine engine 5220 of each of the turbine fracturing devices 5200.

In some examples, as shown in FIG. 8, the compressed air pipeline 5140 is configured to provide compressed air to the turbine engine 5220 of each of the turbine fracturing devices 5200.

In some examples, as shown in FIG. 8, the combustion-gas pipeline 5130 includes a main combustion-gas pipeline 5132 and a plurality of combustion-gas branch pipelines 5134 that are connected with the main combustion-gas pipeline 5132; the compressed air pipeline 5140 includes a compressed air main pipeline 5142 and a plurality of compressed air branch pipelines 5144 that are connected with the compressed air main pipeline 5142; the auxiliary-energy pipeline 5150 includes an auxiliary-energy main pipeline 5152 and a plurality of auxiliary-energy branch pipelines 5154 that are connected with the auxiliary-energy main pipeline 5152. The main combustion-gas pipeline 5132, the auxiliary-energy main pipeline 5152 and the compressed air main pipeline 5142 are arranged between the first fracturing device group 5110 and the second fracturing device group 5120, so that safety management and device maintenance of the combustion-gas pipeline, the auxiliary-energy pipeline and the compressed air pipeline are facilitated.

In some examples, as shown in FIG. 8, the plurality of gas branch pipelines 5134 of the combustion-gas pipeline 5130 are respectively connected with the N+M turbine fracturing devices 5200 of the first fracturing device group 5110 and the second fracturing device group 5120 located on two sides of the main combustion-gas pipeline 5132, and provide combustion-gas for the N+M turbine fracturing devices 5200.

In some examples, as shown in FIG. 8, the plurality of compressed air branch pipelines 5144 of the compressed air pipeline 5140 are respectively connected with the N+M turbine fracturing devices 5200 of the first fracturing device group 5110 and the second fracturing device group 5120 located on two sides of the compressed air main pipeline 5142, and provide compressed air for the N+M turbine fracturing devices 5200.

In some examples, as shown in FIG. 8, the plurality of auxiliary-energy branch pipelines 5154 of the auxiliary-energy pipeline 5150 are respectively connected with the N+M turbine fracturing devices 5200 of the first fracturing device group 5110 and the second fracturing device group 5120 located on two sides of the auxiliary-energy main pipeline 5152, and provide auxiliary-energy for the N+M turbine fracturing devices 5200.

In some examples, as shown in FIG. 8, the fracturing system 5100 further includes a manifold system 5160, the manifold system 5160 is located between the first fracturing device group 5110 and the second fracturing device group 5120, and is configured to deliver fracturing fluid. In this case, the main combustion-gas pipeline 5132, the main auxiliary-energy pipeline 5152 and the main compressed air pipeline 5142 are fixed on the manifold system 5160. In this way, the fracturing system integrates the manifold system for conveying fracturing fluid with combustion-gas pipeline, compressed air pipeline and auxiliary-energy pipeline, which can further facilitate safety management and device maintenance.

In some examples, as shown in FIG. 8, the manifold system 5160 includes at least one high and low pressure manifold skid 5162; each of the high and low pressure manifold skids 5162 is connected with at least one of the turbine fracturing devices 5200, and is configured to deliver low pressure fracturing fluid to the at least one of the turbine fracturing devices 5200, and collect high-pressure fracturing fluid output by the turbine fracturing device.

For example, as shown in FIG. 8, each of the high and low pressure manifold skids 5162 is connected with four turbine fracturing devices 5200. Of course, the embodiments of the present disclosure include but are not limited thereto, the number of the turbine fracturing devices connected with each of the high and low pressure manifold skids can be arranged according to actual situations.

In some examples, as shown in FIG. 8, the manifold system 5160 includes a plurality of high and low pressure manifold skids 5162; the plurality of high and low pressure manifold skids 5162 may be connected through a first high pressure pipe 5164.

For example, the first high pressure pipe can be a rigid pipe or a flexible pipe, which is not specifically limited in the embodiment of the present disclosure.

In some examples, as shown in FIG. 8, the manifold system 5160 further includes a second high pressure pipe 5166, and the second high pressure pipe 5166 is communicated with a fracturing wellhead 5300.

For example, the second high-pressure pipe may be a rigid pipe or a flexible pipe, which is not specifically limited in the embodiment of the present disclosure.

In some examples, as shown in FIG. 8, the fracturing device 5100 further includes a gas supply device 5170, a compressed air supply device 5180 and an auxiliary-energy supply device 5190; the gas supply device 5170 is connected with the combustion-gas pipeline 5130, the compressed air supply device 5180 is connected with the compressed air pipeline 5140, and the auxiliary-energy supply device 5190 is connected with the auxiliary-energy pipeline 5150.

Figure 9:
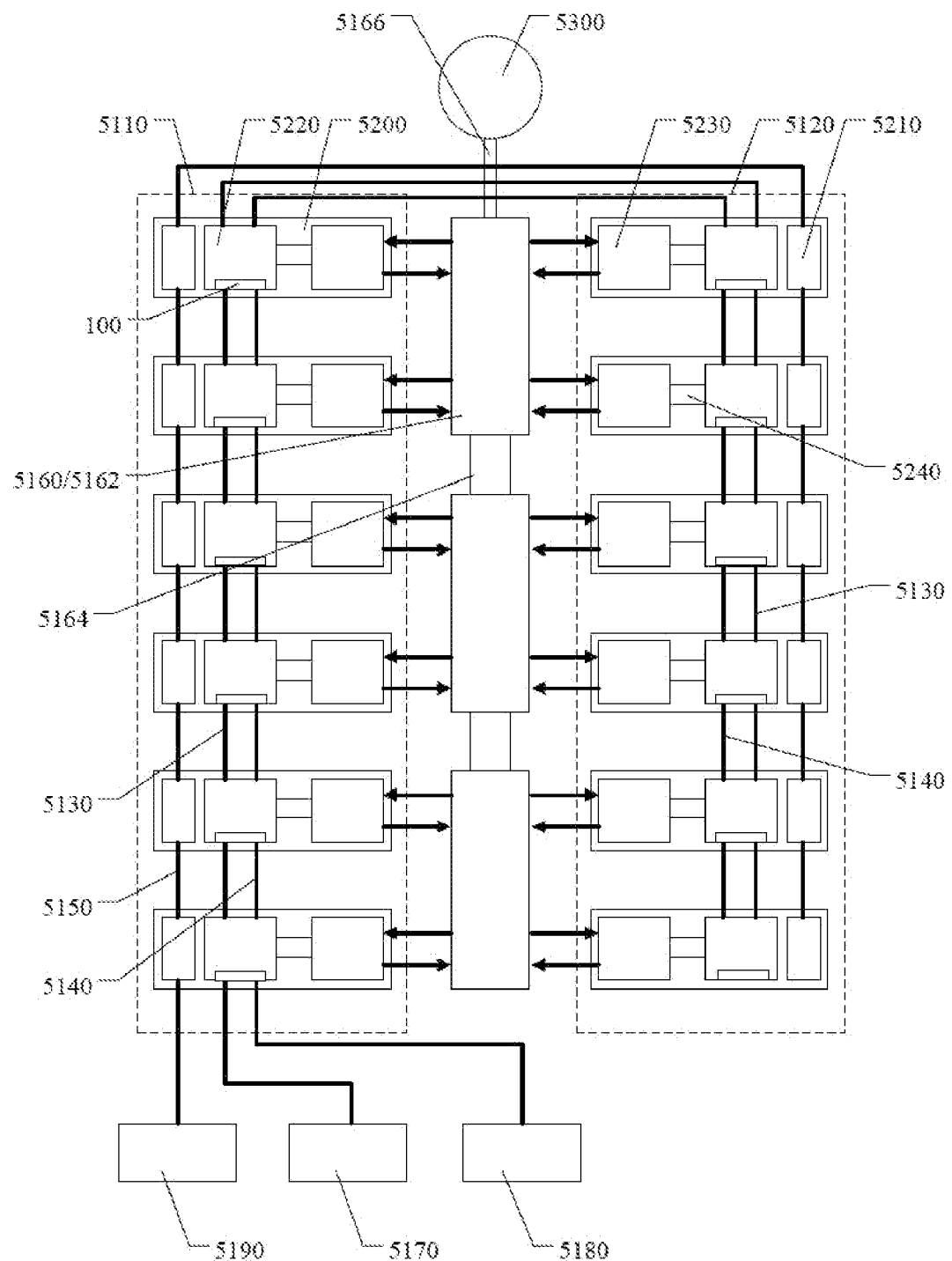
FIG. 9 is a schematic diagram of another fracturing system provided by an embodiment of the present disclosure.

FIG. 9 is a schematic diagram of another fracturing system provided by an embodiment of the present disclosure. As shown in FIG. 9, the combustion-gas pipeline 5130 connects the N+M turbine fracturing devices 5200 of the first fracturing device group 5110 and the second fracturing device group 5120 in series, to provide fuel gas to the N+M turbine fracturing devices 5200. In this way, the fracturing device can connect the N+M turbine fracturing devices of the first fracturing device group and the second fracturing device group in series through the combustion-gas pipeline, so that it is convenient to carry out safety management and device maintenance of the combustion-gas pipeline of the fracturing system.

In some examples, as shown in FIG. 9, the compressed air pipeline 5140 connects the N+M turbine fracturing devices 5200 of the first fracturing device group 5110 and the second fracturing device group 5120 in series, to provide compressed air to the N+M turbine fracturing devices 5200. In this way, the fracturing device can connect the N+M turbine fracturing devices of the first fracturing device group and the second fracturing device group in series through the compressed air pipeline, so that it is convenient to carry out safe management and device maintenance of the compressed air pipeline of the fracturing system.

In some examples, as shown in FIG. 9, the auxiliary-energy pipeline 5150 connects the N+M turbine fracturing devices 5200 of the first fracturing device group 5110 and the second fracturing device group 5120 in series, to provide auxiliary-energy to the auxiliary devices 5210 of the N+M turbine fracturing devices 5200. In this way, the fracturing device can connect the N+M turbine fracturing devices of the first fracturing device group and the second fracturing device group in series through the auxiliary-energy pipeline, so that it is convenient to carry out safety management and device maintenance of auxiliary-energy pipeline of fracturing system.

In some examples, as shown in FIG. 9, the auxiliary device 5210 of each of the turbine fracturing devices 5200 includes a diesel engine, the auxiliary-energy pipeline 5150 is configured to deliver diesel fuel.

In some examples, the auxiliary device may further include an oil pump, a hydraulic system, and a hydraulic motor; the diesel engine can drive the oil pump, thereby driving the hydraulic system; the hydraulic system drives the hydraulic motor to complete various auxiliary tasks, such as, starting the turbine engine, driving the radiator to work, etc. Of course, the embodiments of the present disclosure include but are not limited thereto, the auxiliary device may further include a lubricating system and a lubricating oil pump, the diesel engine can drive the lubricating oil pump, thereby driving the lubricating system to work.

In some examples, as shown in FIG. 9, the auxiliary device 5210 of each of the turbine fracturing devices 5200 includes an electric motor, the auxiliary-energy pipeline 5150 is configured to deliver electrical power.

In some examples, the auxiliary device may further include an oil pump, a hydraulic system, and a hydraulic motor; the electric motor can drive the oil pump, thereby driving the hydraulic system; the hydraulic system drives the hydraulic motor to complete various auxiliary tasks, such as starting the turbine engine, driving the radiator, etc. Of course, the embodiments of the present disclosure include but are not limited thereto, the auxiliary device may further include a lubricating system and a lubricating oil pump, the electric motor drives the lubricating oil pump, thereby driving lubrication.

In some examples, as shown in FIG. 9, the fracturing device 5100 further includes a gas supply device 5170, a compressed air supply device 5180 and an auxiliary-energy supply device 5190; the gas supply device 5170 is connected with the combustion-gas pipeline 5130, the compressed air supply device 5180 is connected with the compressed air pipeline 5140, and the auxiliary-energy supply device 5190 is connected with the auxiliary-energy pipeline 5150.

In some examples, as shown in FIG. 9, the gas supply device 5170 may be connected with a fracturing device 5200 in the first fracturing device group 5110 or the second fracturing device group 5120, which is close to the gas supply device 5170, then the N+M turbine fracturing devices 5200 of the first fracturing device group 5110 and the second fracturing device group 5120 are connected in series, to provide fuel gas to the N+M turbine fracturing devices 5200.

In some examples, as shown in FIG. 9, each of the turbine fracturing devices 5200 includes a turbine engine 5220, a fracturing pump 5230 and a transmission mechanism 5240; the turbine engine 5220 is connected with the fracturing pump 5230 through the transmission mechanism 5240; the combustion-gas pipeline 5130 is configured to provide fuel, such as natural gas, to the turbine engine 5220 of each of the turbine fracturing devices 5200.

In some examples, as shown in FIG. 9, the compressed air supply device 5180 may be connected with a fracturing device 5200 in the first fracturing device group 5110 or the second fracturing device group 5120, which is close to the compressed air supply device 5180, then the N+M turbine fracturing devices 5200 of the first fracturing device group 5110 and the second fracturing device group 5120 are connected in series, to provide compressed air to the N+M turbine fracturing devices 5200.

In some examples, as shown in FIG. 9, the compressed air pipeline 5140 is configured to provide compressed air to the turbine engine 5220 of each of the turbine fracturing devices 5200.

In some examples, as shown in FIG. 9, the auxiliary-energy supply device 5190 may be connected with a fracturing device 5200 in the first fracturing device group 5110 or the second fracturing device group 5120, which is close to the auxiliary-energy supply device 5190, then the N+M turbine fracturing devices 5200 of the first fracturing device group 5110 and the second fracturing device group 5120 are connected in series, to provide auxiliary-energy to the auxiliary devices 5210 of the N+M turbine fracturing devices 5200.

In some examples, as shown in FIG. 9, the manifold system 5160 includes at least one high and low pressure manifold skid 5162; each of the high and low pressure manifold skids 5162 is connected with at least one turbine fracturing device 5200, is configured to deliver low pressure fracturing fluid to the turbine fracturing device 5200, and collect high-pressure fracturing fluid output by the turbine fracturing device.

In some examples, as shown in FIG. 9, the manifold system 5160 includes a plurality of high and low pressure manifold skids 5162; the plurality of high and low pressure manifold skids 5162 may be connected through the first high pressure pipe 5164.

In some examples, as shown in FIG. 9, the manifold system 5160 further includes a second high pressure pipe 5166, the second high pressure pipe 5166 is communicated with the fracturing wellhead 5300.

Figure 10:
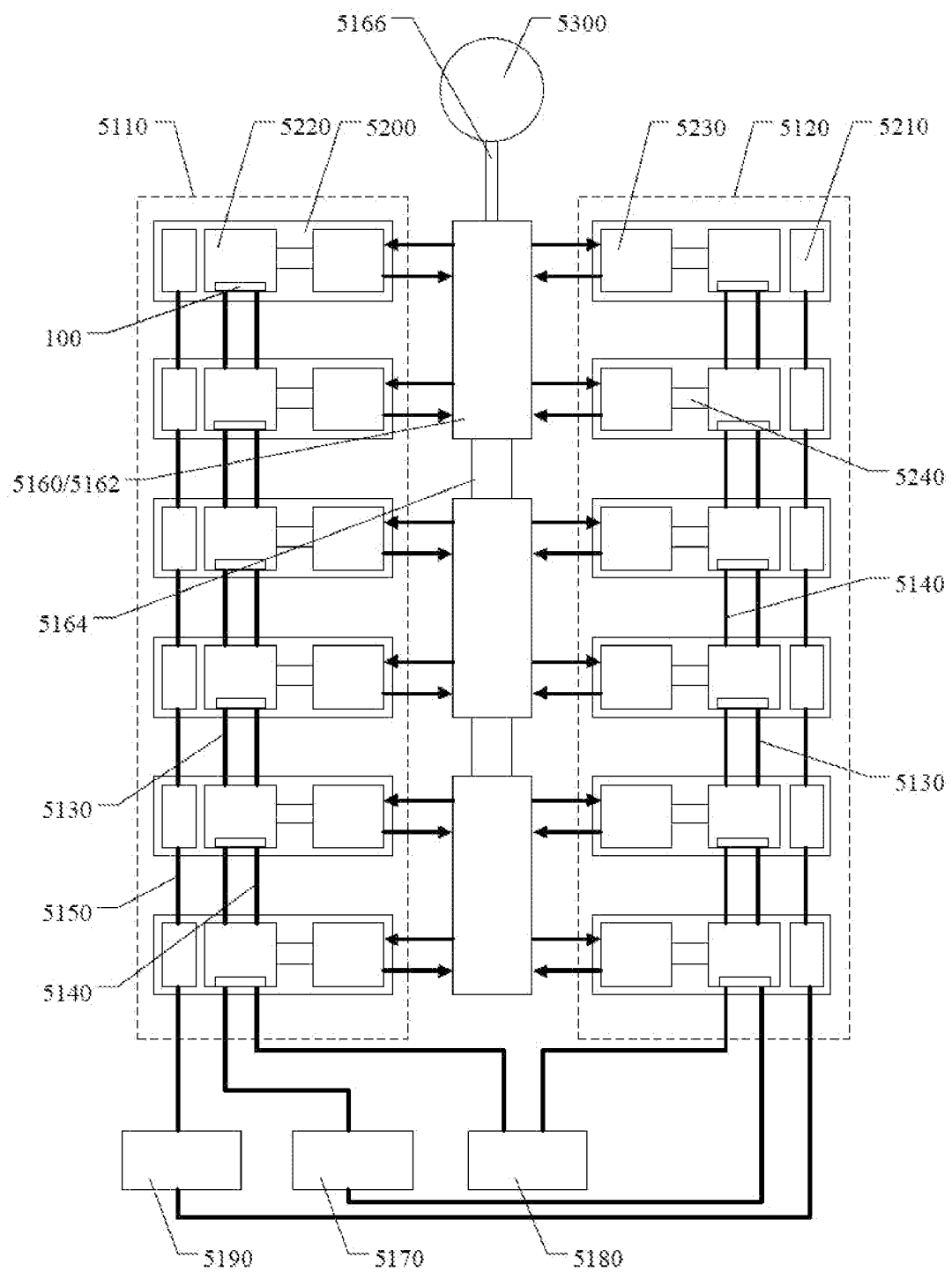
FIG. 10 is a schematic diagram of still another fracturing system provided by an embodiment of the present disclosure.

FIG. 10 is a schematic diagram of another fracturing system provided by an embodiment of the present disclosure. As shown in FIG. 10, the combustion-gas pipeline 5130 includes a first sub combustion-gas pipeline 5130A and a second sub combustion-gas pipeline 5130B, the first sub combustion-gas pipeline 5130A connects the N turbine fracturing devices 5200 of the first fracturing device group 5110 in series, to provide fuel gas to the N turbine fracturing devices 5200, the second sub combustion-gas pipeline 5130B connects the M turbine fracturing devices 5200 of the second fracturing device group 5130B in series, to provide fuel gas to the M turbine fracturing devices 5200. In this way, the fracturing system provides fuel gas to the N turbine fracturing devices in the first fracturing device group and the M turbine fracturing devices in the second fracturing device group through the first sub combustion-gas pipeline and the second sub combustion-gas pipeline, respectively, so that safety management and device maintenance are facilitated.

In some examples, as shown in FIG. 10, the compressed air pipeline 5140 includes a first sub-compressed air pipeline 5140A and a second sub-compressed air pipeline 5140B, the first sub-compressed air pipeline 5140A connects the N turbine fracturing devices 5200 of the first fracturing device group 5110 in series, to provide compressed air to the N turbine fracturing devices 5200, the second sub-compressed air pipeline 5140B connects the M turbine fracturing devices 5200 of the second fracturing device group 5120 in series, to provide compressed air to the M turbine fracturing devices 5200. In this way, the fracturing system provides compressed air to the N turbine fracturing devices in the first fracturing device group and the M turbine fracturing devices in the second fracturing device group through the first sub-compressed air pipeline and the second sub-compressed air pipeline, respectively, so that safety management and device maintenance are facilitated.

In some examples, as shown in FIG. 10, the auxiliary-energy pipeline 5150 includes a first sub auxiliary-energy pipeline 5150A and a second sub auxiliary-energy pipeline 5150B, the first sub-auxiliary-energy pipeline 5150A connects the N turbine fracturing devices 5200 of the first fracturing device group 5110 in series, to provide auxiliary-energy to the auxiliary devices 5210 of the N turbine fracturing devices 5200, the second sub-auxiliary-energy pipeline 5150B connects the M turbine fracturing devices 5200 of the second fracturing device group 5120 in series, to provide auxiliary-energy to the auxiliary devices 5210 of the M turbine fracturing devices 5200. In this way, the fracturing system provides auxiliary-energy to the auxiliary devices of the N turbine fracturing devices in the first fracturing device group and the auxiliary devices of the M turbine fracturing devices in the second fracturing device group through the first sub auxiliary-energy pipeline and the second sub auxiliary-energy pipeline, respectively, so that safety management and device maintenance are facilitated.

The following points required to be explained:

(1) The accompanying drawings involve only the structure(s) in connection with the embodiment(s) of the present disclosure, and other structure(s) can be referred to common design(s).

(2) In case of no conflict, the embodiments of the present disclosure and the features in the embodiments can be combined with each other to obtain new embodiments.

What have been described above are only specific implementations of the present disclosure, the protection scope of the present disclosure is not limited thereto, and easily conceivable changes or substitutions should be covered within the protection scope of the present disclosure. Therefore, the protection scope of the present disclosure should be based on the protection scope of the claims.

What is claimed is:

1. A combustion-gas supply system, comprising:
a main pipeline, comprising a first sub-pipeline and a second sub-pipeline connected with the first sub-pipeline; and
a multi-functional pipeline,
wherein:
the first sub-pipeline comprises:
a first gas intake pipe, a first gas supply valve and a first gas outlet pipe arranged in sequence, the first gas intake pipe being configured to input the combustion-gas;
a combustion-gas pressure regulating valve located between the first gas supply valve and the first gas outlet pipe; and
a bypass one-way valve, an input end of the bypass one-way valve being in communication with the first gas outlet pipe, an output end of the bypass one-way valve being located between the combustion-gas pressure regulating valve and the first gas supply valve, and the bypass one-way valve permitting flow therethrough in a direction from the input end to the output end, and disallowing flow therethrough in a direction from the output end to the input end;
the second sub-pipeline comprises a combustion-gas supply valve and a gas supply pipe, the first gas outlet pipe being connected with the combustion-gas supply valve and the gas supply pipe being configured to be connected with a turbine engine;
the multi-functional pipeline comprises a second gas intake pipe, a second gas supply valve and a second gas outlet pipe arranged in sequence, the second gas outlet pipe being connected to the first gas outlet pipe; and
the combustion gas comprises a gaseous fuel.

2. The combustion-gas supply system according to claim 1, wherein the first sub-pipeline further comprises:
at least one gas filter, located between the first gas supply valve and the combustion-gas pressure regulating valve; and
a gas source pressure gauge, located between the first gas supply valve and the gas filter, or located between the first gas intake pipe and the first gas supply valve,
wherein the output end of the bypass one-way valve is located between the gas filter and the combustion-gas pressure regulating valve.

3. The combustion-gas supply system according to claim 2, wherein the first sub-pipeline further comprises a first pressure sensor, the first pressure sensor being located between the first gas supply valve and the gas filter, and configured to monitor gas supply pressure in real time.

4. The combustion-gas supply system according to claim 1, further comprising:
a blowdown valve, located between the first gas supply valve and the combustion-gas pressure regulating valve,
wherein a height of the blowdown valve is less than a height of the main pipeline.

5. The combustion-gas supply system according to claim 1, wherein the first sub-pipeline further comprises:
a gas temperature sensor, located on the first gas outlet pipe and configured to detect temperature of the combustion-gas in the first gas outlet pipe; and
a pressure sensor, located on the first gas outlet pipe and configured to detect pressure of the combustion-gas in the first gas outlet pipe.

6. The combustion-gas supply system according to claim 1, further comprising:
a first gas supply interface, comprising a first gas delivery pipe, wherein the first gas delivery pipe is in communication with the first gas intake pipe;
a second gas supply interface, comprising a second gas delivery pipe, wherein the second gas delivery pipe is in communication with the first gas intake pipe; and
a third gas supply interface, comprising a third gas delivery pipe, wherein the third gas delivery pipe is in communication with the first gas intake pipe,
wherein both a pipe diameter of the second gas delivery pipe and a pipe diameter of the third gas delivery pipe are larger than a pipe diameter of the first gas delivery pipe, and both the pipe diameter of the second gas delivery pipe and the pipe diameter of the third gas delivery pipe are larger than a pipe diameter of the first gas intake pipe.

7. The combustion-gas supply system according to claim 6, wherein both the pipe diameter of the second gas delivery pipe and the pipe diameter of the third gas delivery pipe are greater than or equal to two times the pipe diameter of the first gas delivery pipe.

8. The combustion-gas supply system according to claim 1, wherein the second sub-pipeline further comprises:
a flow control valve, located between the combustion-gas supply valve and the gas supply pipe; and
a gas one-way valve, wherein an input end of the gas one-way valve is connected with the flow control valve, and an output end of the gas one-way valve is in communication with the gas supply pipe.

9. The combustion-gas supply system according to claim 8, wherein the second sub-pipeline further comprises:
a gas exhaust valve, located between the combustion-gas supply valve and the gas one-way valve.

10. A device equipped with the turbine engine, comprising:
the turbine engine; and
the combustion-gas supply system according to claim 1,
wherein the turbine engine comprises a fuel nozzle, and the gas supply pipe is configured to provide the combustion-gas to the fuel nozzle.

11. A fracturing system comprising at least one gas supply system of claim 1, comprising:
a first fracturing device group, comprising N turbine fracturing devices;
a second fracturing device group, comprising M turbine fracturing devices;
a combustion-gas pipeline, wherein the combustion-gas pipeline is connected with the first fracturing device group and the second fracturing device group, and is configured to provide combustion-gas to the N+M turbine fracturing devices;
a compressed air pipeline, wherein the compressed air pipeline is connected with the first fracturing device group and the second fracturing device group, and is configured to provide compressed air to the N+M turbine fracturing devices; and
an auxiliary-energy supply line,
wherein each of the turbine fracturing devices comprises a turbine engine and an auxiliary device, and the auxiliary-energy supply line is connected with the first fracturing device group and the second fracturing device group, and is configured to provide auxiliary-energy to auxiliary devices of the N+M turbine fracturing devices;

wherein N and M are positive integers greater than or equal to 2; and wherein each of the turbine fracturing devices comprises a turbine engine and the combustion-gas supply system according to claim 1, the combustion-gas supply system is connected with the combustion-gas pipeline, and is configured to provide combustion-gas to the turbine engine.

12. The fracturing system according to claim 11, wherein;

the auxiliary device comprises a diesel engine and the auxiliary-energy supply line is configured to deliver diesel fuel;

or the auxiliary device comprises an electric motor and the auxiliary-energy supply line is configured to deliver electrical power.

13. The fracturing system according to claim 11, wherein the combustion-gas pipeline comprises a main combustion-gas pipeline and a plurality of combustion-gas branch pipelines connected with the main combustion-gas pipeline, the auxiliary-energy supply line comprises an auxiliary-energy main supply line and a plurality of auxiliary-energy branch supply lines connected with the auxiliary-energy main supply line, the compressed air pipeline comprises a compressed air main pipeline and a plurality of compressed air branch pipelines connected with the compressed air main pipeline, and wherein the main combustion-gas pipeline, the main auxiliary-energy supply line and the main compressed air pipeline are arranged between the first fracturing device group and the second fracturing device group.

14. The fracturing system according to claim 13, further comprising:

a manifold system, located between the first fracturing device group and the second fracturing device group, and configured to transport fracturing fluid, wherein the main combustion-gas pipeline, the main auxiliary-energy supply line and the main compressed air pipeline are fixed on the manifold system, and the manifold system comprises at least one high and low pressure manifold skid.

15. The fracturing system according to claim 14, wherein the combustion-gas pipeline connects the N+M turbine fracturing devices of the first fracturing device group and the second fracturing device group in series, to provide combustion-gas to the N+M turbine fracturing devices, the compressed air pipeline connects the N+M o turbine fracturing devices of the first fracturing device group and the second fracturing device group in series, to provide compressed air to the N+M turbine fracturing devices, the auxiliary-energy supply line connects the N+M turbine fracturing devices of the first fracturing device group and the second fracturing device group in series, to provide auxiliary-energy to the auxiliary devices of the N+M turbine fracturing devices.

16. The fracturing system according to claim 11, wherein:

the combustion-gas pipeline comprises a first sub combustion-gas pipeline and a second sub combustion-gas pipeline;

the first sub combustion-gas pipeline connects the N turbine fracturing devices of the first fracturing device group in series, to provide combustion-gas to the N turbine fracturing devices;

the second sub combustion-gas pipeline connects the M turbine fracturing devices of the second fracturing device group in series, to provide combustion-gas to the M turbine fracturing devices, the compressed air pipeline comprises a first sub compressed air pipeline and a second sub compressed air pipeline, the first sub compressed air pipeline connecting the N turbine fracturing devices of the first fracturing device group in series, to provide compressed air to the N turbine fracturing devices, and the second sub compressed air pipeline connecting the M turbine fracturing devices of the second fracturing device group in series, to provide compressed air to the M turbine fracturing devices, and the auxiliary-energy supply line comprises a first sub-auxiliary-energy supply line and a second-sub-auxiliary-energy supply line, the first sub-auxiliary-energy supply line connecting the N turbine fracturing devices of the first fracturing device group in series, to provide auxiliary-energy to the auxiliary devices of the N turbine fracturing devices, and the second sub-auxiliary-energy supply line connecting the M turbine fracturing devices of the second fracturing device group in series, to provide auxiliary-energy to the auxiliary devices of the M turbine fracturing devices.

\* \* \* \* \*